United States Patent
Park et al.

(10) Patent No.: US 11,974,223 B2
(45) Date of Patent: Apr. 30, 2024

(54) TECHNIQUES FOR POWER SAVING IN SIDELINK COMMUNICATIONS

(71) Applicant: QUALCOMM Incorporated, San Diego, CA (US)

(72) Inventors: Cheol Hee Park, San Diego, CA (US); Gideon Kutz, Ramat Hasharon (IL); Shmuel Vagner, Raanana (IL); Lior Uziel, Hod Hasharon (IL); Moshe Ben-Ari, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 17/123,716

(22) Filed: Dec. 16, 2020

(65) Prior Publication Data
US 2022/0191792 A1 Jun. 16, 2022

(51) Int. Cl.
*H04W 52/02* (2009.01)
*H04W 72/20* (2023.01)

(52) U.S. Cl.
CPC ....... *H04W 52/0229* (2013.01); *H04W 72/20* (2023.01)

(58) Field of Classification Search
None
See application file for complete search history.

(56) References Cited

U.S. PATENT DOCUMENTS

| | | | | |
|---|---|---|---|---|
| 2001/0044915 A1* | 11/2001 | Vandersteen | ....... | H04L 27/2614 714/704 |
| 2010/0227608 A1* | 9/2010 | Avadhanam | ....... | H04W 24/10 455/425 |
| 2017/0171814 A1* | 6/2017 | Belghoul | ....... | H04W 4/90 |
| 2018/0206260 A1* | 7/2018 | Khoryaev | ....... | H04W 72/1289 |
| 2019/0246250 A1* | 8/2019 | Uchiyama | ....... | H04W 52/0261 |
| 2020/0053528 A1* | 2/2020 | Wang | ....... | H04W 72/044 |

(Continued)

FOREIGN PATENT DOCUMENTS

| WO | WO-2020033622 A1 | 2/2020 |
|---|---|---|
| WO | WO-2020197300 A1 | 10/2020 |
| WO | WO-2020205995 A1 | 10/2020 |

OTHER PUBLICATIONS

International Search Report and Written Opinion—PCT/US2021/059699—ISA/EPO—dated Feb. 16, 2022.

*Primary Examiner* — Nguyen H Ngo
(74) *Attorney, Agent, or Firm* — Dalei Dong; Holland & Hart LLP

(57) ABSTRACT

Methods, systems, and devices for wireless communications are described. Some wireless communications systems may support communications. For example, a wireless communications system may support New Radio (NR) cellular-vehicle to everything (C-V2X) communication. In some examples, a user equipment (UE) may receive a sidelink control channel for a sidelink transmission on a first set of symbols of a time slot (e.g., the first two or three symbols of a time slot). The UE may decode the sidelink control channel and disable one or more radio frequency (RF) components associated with processing the sidelink transmission on a second set of symbols of the time slot based on decoding the sidelink control channel. For example, the UE may disable one or more RF components if the UE determines the sidelink control channel is decoded unsuccessfully.

30 Claims, 11 Drawing Sheets

(56) References Cited

U.S. PATENT DOCUMENTS

| | | | |
|---|---|---|---|
| 2020/0092685 A1* | 3/2020 | Fehrenbach | H04W 84/047 |
| 2021/0045093 A1* | 2/2021 | Rao | H04W 72/04 |
| 2021/0184819 A1* | 6/2021 | Takeda | H04W 24/10 |
| 2021/0243728 A1* | 8/2021 | Lee | H04L 27/2602 |
| 2021/0400632 A1* | 12/2021 | Yang | H04L 27/26025 |

* cited by examiner

TECHNIQUES FOR POWER SAVING IN SIDELINK COMMUNICATIONS

FIELD OF DISCLOSURE

The present disclosure, for example, relates to wireless communications, more particularly to techniques for power saving in sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems may support sidelink communications. That is, some wireless communications systems may support direct communications between two or more wireless devices, such as two or more UEs. Some techniques for sidelink communications, however, may be deficient in some implementations.

SUMMARY

The described techniques relate to improved methods, systems, devices, and apparatuses that support techniques for power saving in sidelink communications. For example, the described techniques provide for a receiving user equipment (UE) to disable or shutdown components or operations related to processing at least a portion of a physical sidelink shared channel (PSSCH). A UE may receive sidelink control information (SCI) from one or more other UEs, where the SCI is received over a first portion of a time slot (e.g., first two or three symbols of a time slot). The UE may decode the SCI and determine a decoding outcome of the SCI. The UE may determine that no data packets are present on the PSSCH (e.g., sidelink communication is suspended) based on an unsuccessful decoding outcome. For example, if the UE determines that the decoding outcome is unsuccessful, the UE may determine to disable one or more radio frequency (RF) components for the remaining symbols of the time slot. As such, the UE may reduce power consumption in relation to processing packets on the PSSCH during suspension of sidelink communications, which may prevent possible damage to device components in thermal conditions (e.g., during high temperatures).

A method for wireless communication at a UE is described. The method may include receiving, on a first set of symbols of a time slot, a sidelink control channel for a sidelink transmission, decoding the sidelink control channel, and disabling one or more RF components associated with processing the sidelink transmission on a second set of symbols of the time slot based on decoding the sidelink control channel.

An apparatus for wireless communication is described. The apparatus may include a processor, memory in electronic communication with the processor, and instructions stored in the memory. The instructions may be executable by the processor to cause the apparatus to receive, on a first set of symbols of a time slot, a sidelink control channel for a sidelink transmission, decode the sidelink control channel, and disable one or more RF components associated with processing the sidelink transmission on a second set of symbols of the time slot based on decoding the sidelink control channel.

Another apparatus for wireless communication is described. The apparatus may include means for receiving, on a first set of symbols of a time slot, a sidelink control channel for a sidelink transmission, means for decoding the sidelink control channel, and means for disabling one or more RF components associated with processing the sidelink transmission on a second set of symbols of the time slot based on decoding the sidelink control channel.

A non-transitory computer-readable medium storing code for wireless communication is described. The code may include instructions executable by a processor to receive, on a first set of symbols of a time slot, a sidelink control channel for a sidelink transmission, decode the sidelink control channel, and disable one or more RF components associated with processing the sidelink transmission on a second set of symbols of the time slot based on decoding the sidelink control channel.

Some examples of the method, apparatuses, and non-transitory computer-readable medium described herein may further include operations, features, means, or instructions for comparing a received signal strength indicator (RSSI) associated with the sidelink control channel to a threshold and determining that the RSSI associated with the sidelink control channel satisfies the threshold based on the comparing, where disabling the one or more RF components may be based on the RSSI associated with the sidelink control channel satisfying the threshold.

Some examples of the method, apparatuses, and non-transitory computer-readable medium described herein may further include operations, features, means, or instructions for comparing a reference signal receive power (RSRP) associated with the sidelink control channel to a threshold and determining that the RSRP associated with the sidelink control channel satisfies the threshold based on the comparing, where disabling the one or more RF components may be based on the RSRP associated with the sidelink control channel satisfying the threshold.

In some examples of the method, apparatuses, and non-transitory computer-readable medium described herein, receiving the sidelink control channel for the sidelink transmission may include operations, features, means, or instructions for receiving, on a first subchannel associated with the first set of symbols, a first sidelink control channel candidate associated with the sidelink transmission and receiving, on a second subchannel associated with the first set of symbols, a second sidelink control channel candidate associated with the sidelink transmission.

Some examples of the method, apparatuses, and non-transitory computer-readable medium described herein may further include operations, features, means, or instructions for determining that a decoding procedure may be unsuccessful for at least one of the first sidelink control channel candidate, the second sidelink control channel candidate, or both, where disabling the one or more RF components may be based on determining that the decoding procedure may be unsuccessful.

Some examples of the method, apparatuses, and non-transitory computer-readable medium described herein may further include operations, features, means, or instructions for receiving, on a third set of symbols of the time slot, a demodulation reference signal (DMRS) associated with the sidelink transmission and determining a DMRS correlation based on the received DMRS, where disabling the one or more RF components may be based on the determined DMRS correlation.

In some examples of the method, apparatuses, and non-transitory computer-readable medium described herein, the DMRS correlation may be determined based on an antenna port, a DMRS orthogonal frequency-division multiplexing (OFDM) symbol, a sample index, the received DMRS, or a combination thereof.

In some examples of the method, apparatuses, and non-transitory computer-readable medium described herein, disabling the one or more RF components may include operations, features, means, or instructions for disabling a baseband processing on the second set of symbols of the time slot based on decoding the sidelink control channel.

In some examples of the method, apparatuses, and non-transitory computer-readable medium described herein, the baseband processing includes at least one of a channel estimation procedure, a time and frequency-domain synchronization procedure, a demodulation procedure, a decoding procedure, or a combination thereof.

In some examples of the method, apparatuses, and non-transitory computer-readable medium described herein, the one or more RF components include at least one of an antenna, a mixer, an amplifier, or a combination thereof.

In some examples of the method, apparatuses, and non-transitory computer-readable medium described herein, the first set of symbols includes two OFDM symbols or three OFDM symbols.

In some examples of the method, apparatuses, and non-transitory computer-readable medium described herein, the sidelink control channel includes at least one of a first SCI, a second SCI, or a combination thereof.

DETAILED DESCRIPTION

Figure 1:
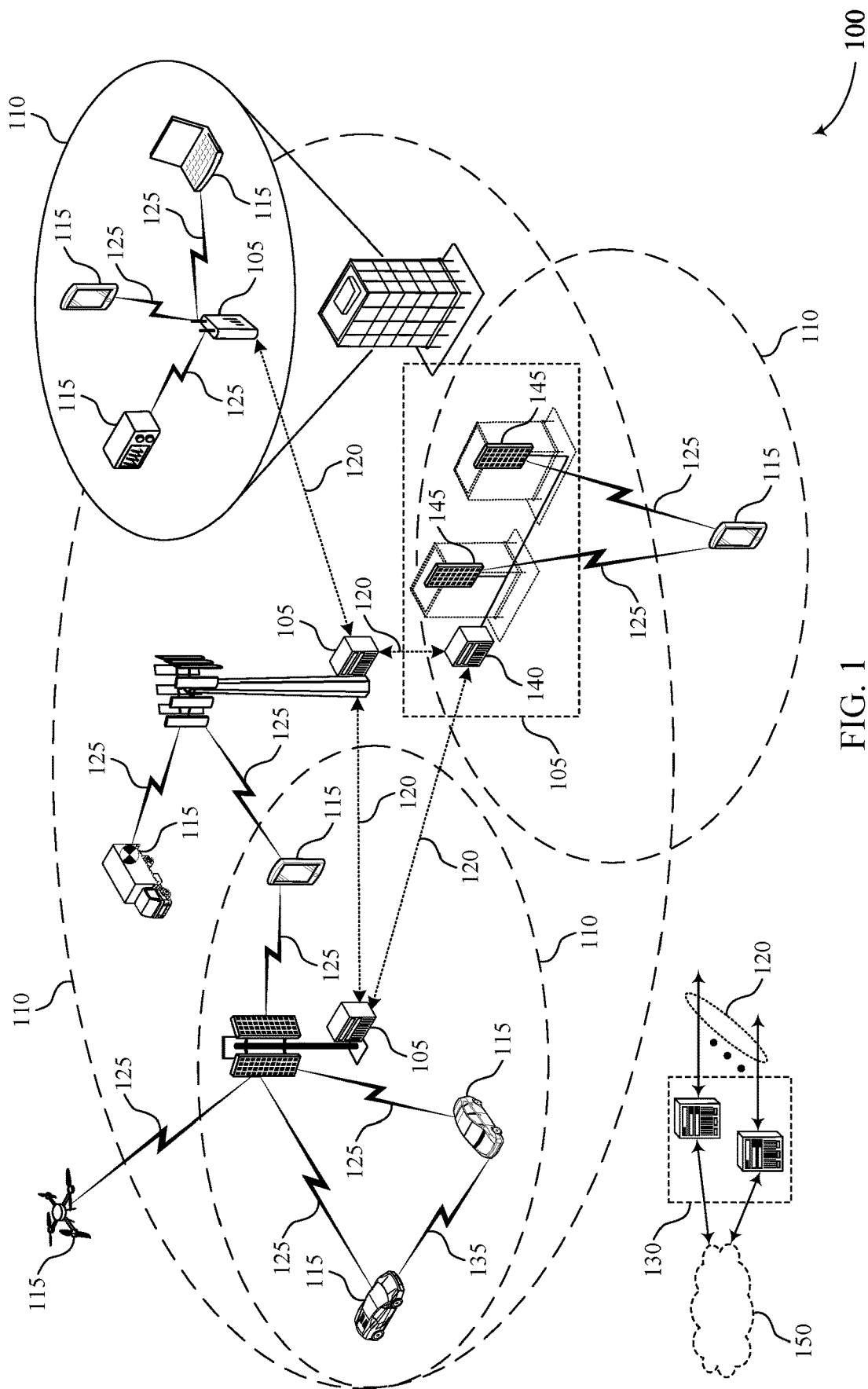
FIG. 1 and FIG. 2 illustrate examples of a wireless communications system that supports techniques for power saving in sidelink communications in accordance with aspects of the present disclosure.

Some wireless communications systems may support sidelink communications. Sidelink communications may allow direct communication between two or more user equipment (UEs). It is noted that while various examples provided herein are discussed for UE sidelink devices, such sidelink techniques may be used for any type of wireless devices that use sidelink communications. For example, a sidelink may support one or more of device-to-device (D2D) communication, vehicle-to-vehicle (V2V) communication, vehicle-to-everything (V2X) communication, and the like. Although, cellular V2X (C-V2X) applications in devices (e.g., vehicles) may not be limited by a device's battery, in the event of high temperature situations, C-V2X communications may be suspended. That is, even if a device may not receive data packets, the device may still support high power operations such as the continued use of radio frequency (RF) components and baseband processing operations. As such, the device may attempt to decode a data channel (e.g., perform RF and baseband processing) when no data packets are present resulting in excess power consumption and possible damage to device hardware.

One or more aspects of the present disclosure support techniques for power savings in sidelink communications. For example, a first UE may receive sidelink control information (SCI) from a second UE via a physical sidelink control channel (PSCCH). In some examples, the PSCCH may be limited to a subset of symbols in a time slot. For example, the PSCCH may be constrained to two or three orthogonal frequency-division multiplexing (OFDM) symbols in a time slot. The first UE may attempt to decode the PSCCH and if the PSCCH is decoded unsuccessfully, then the first UE may disable one or more RF components associated with PSSCH processing for the remaining OFDM symbols of the corresponding slot. For instance, if the first UE determines that the PSCCH is decoded unsuccessfully, the first UE may disable baseband processing (e.g., channel estimation) over the remaining symbols of the time slot. On the other hand, if the first UE determines that the PSCCH is decoded successfully, then the first UE may process the PSSCH over the remaining OFDM symbols utilizing RF components and baseband processing. In some examples, the first UE may determine whether the PSCCH is decoded successfully by comparing a received signal strength indicator (RSSI) or a reference signal receive power (RSRP) of a subset of symbols of the slot to a threshold. Thus, one or more techniques described herein may allow a UE to disable operations related to RF or baseband processing of a PSSCH which may reduce power consumption at the UE.

UEs capable of disabling RF components may utilize the techniques described herein to experience power saving, such as reduced power consumption and extended battery life while ensuring reliable and efficient communications between UEs and base stations. Some aspects of the subject matter described in this disclosure may be implemented to realize one or more of the following potential advantages. The techniques employed by the described UEs may provide benefits and enhancements to the operation of the UEs. For example, operations performed by the UEs may provide improvements to wireless operations. Additionally or alternatively, the techniques employed by the described UEs may provide time and power savings. In some examples, the UEs may support high reliability and low latency communications, among other examples, in accordance with aspects of the present disclosure. The described techniques may thus include features for improvements to power consumption, spectral efficiency, higher data rates and, in some examples, may promote enhanced efficiency for high reliability and low latency operations, among other benefits.

Aspects of the disclosure are initially described in the context of wireless communications systems. Additional aspects are described in the context of process flows. Aspects of the disclosure are further illustrated by and described with reference to apparatus diagrams, system diagrams, and flowcharts that relate to techniques for power saving in sidelink communications.

FIG. 1 illustrates an example of a wireless communications system 100 that supports techniques for power saving in sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may include of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a D2D communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some examples, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at some orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

According to one or more aspects of the present disclosure, a UE 115 may disable or shut down components or operations related to processing at least a portion of a physical sidelink shared channel (PSSCH). For examples, the UE 115 may receive a sidelink control information (SCI) from one or more other UEs, where the SCI is included in a first portion of a time slot (e.g., first two or three symbols of a time slot). The UE 115 may attempt to decode the SCI and determine a decoding outcome of the SCI. An unsuccessful decoding outcome may indicate that no data packets are present on the PSSCH (e.g., sidelink communication is suspended). In some examples, if the UE 115 determines that the decoding outcome is unsuccessful, then the UE 115 may disable one or more RF components for the remaining symbols of the time slot. As such, the UE 115 may reduce power consumption in relation to processing packets on the PSSCH during suspension of sidelink communications which may prevent possible damage to device components in thermal conditions (e.g., during high temperature).

Figure 2:
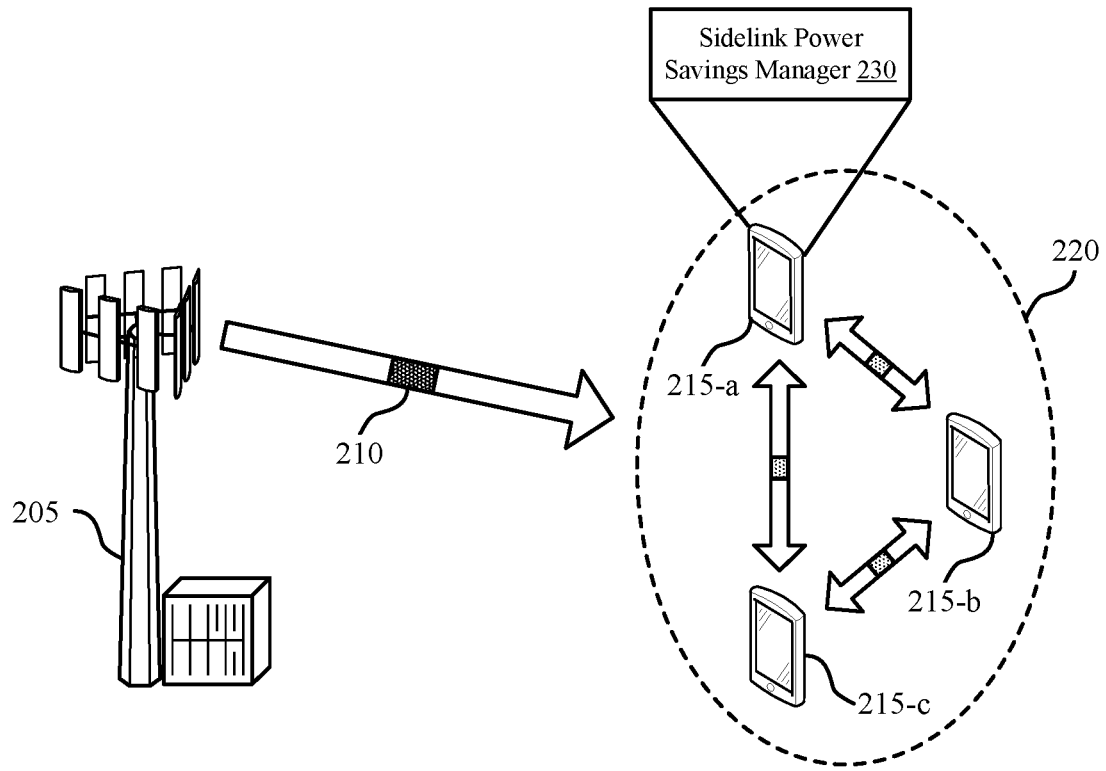

FIG. 2 illustrates an example of a wireless communications system 200 that supports techniques for power saving in sidelink communications in accordance with aspects of the present disclosure. In some examples, the wireless communications system 200 may implement aspects of a wireless communications system 100. For example, the wireless communications system 200 may include a base station 205 and one or more UEs (e.g., UE 215-a, UE 215-b, and UE 215-c), which may be examples of a base station 105 and a UE 115 with reference to FIG. 1. The UE 215-a, the UE 215-b, and the UE 215-b may be examples of vehicle UEs (VUEs), cellphones, laptops, or any other type of wireless device.

In some cases, the wireless communications system 200 may utilize control signaling to schedule resources for UEs 215 to perform sidelink communications. Additionally or alternatively, the UEs 215 in the wireless communications system 200 may utilize shared information to enhance scheduling, inter-UE coordination, and communications flexibility. In some examples, the group of UEs 215 (e.g., UE 215-a, UE 215-b, and UE 215-c) may communicate with each other (e.g., within a V2X system, a D2D system, and the like) and may employ sidelink transmissions to save power, reduce latency, and ensure reliable communications.

The wireless communications system 200 may support both access links and sidelinks for communications between one or more communication devices. An access link may refer to a communication link between a UE 215 (such as, UE 215-a and UE 215-b) and a base station 205. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. For instance, some examples of sidelink communications may be D2D communication, V2V communication, V2X communication and the like. The wireless communications system 200 may support one or more of D2D communications, V2X or V2V communications, message relaying, discovery signaling, beacon signaling, or other signals transmitted over-the-air from one UE to one or more other UEs.

In some examples, a group of UEs 220 including the UE 215-a, the UE 215-b, and the UE 215-c may communicate with one another via sidelink. In order to support sidelink communications within the group of UEs 220, a base station 205 may transmit downlink control information (DCI) 210 to the group of UEs 220 over the physical downlink control channel (PDCCH). As depicted herein, the DCI 210 may allocate resources (e.g., time and frequency resources) to the group of UEs 220 for sidelink communications. The UE 215-a, the UE 215-b, and the UE 215-c may reserve sets of the allocated resources for sidelink communications and indicate the reserved resources along with other control information to one another by transmitting SCI 225 over the PSCCH. In some examples, the SCI 225 may be transmitted over all or a majority of OFDM symbols of a time slot (e.g., 12 or more OFDM symbols). After decoding the PSCCH, a UE 215 (e.g., UE 215-a) may perform baseband processing procedures (e.g., channel estimation) using one or more reference signals (e.g., demodulation reference signal (DMRS)) and decode data packets received over a PSSCH from other UEs 215 (e.g., UE 215-b and/or UE 215-c).

In some examples, sidelink communications may be utilized in different ways depending on an associated random access technology (RAT). For example, NR V2X communication may be utilized for platooning and sensor sharing, whereas LTE V2X communication may be utilized for basic safety messages (BSMs). In some examples, V2X communication may not be limited by a vehicle's (e.g., UE 215-a, UE 215-b, or UE 215-c) battery capacity because V2X communication is enabled when the vehicles ignition is turned on and thus there is enough power for V2X applications. That is, the vehicle may be configured to provide enough power for V2X communications to be supported. In some instances, low power consumption may be used for V2X communication for its continuation of services under thermal situations. However, in some situations, V2X communications may be suspended. For example, when the vehicle encounters high thermal temperatures, such sidelink communications may be suspended (e.g., PSSCH packets may not be present in a time slot). In such situations, the vehicle may not receive data packets over the PSSCH from other vehicles. Even if the vehicle may not receive data packets due to V2X suspension (e.g., during high temperature), the vehicle may still perform baseband processing procedures over all symbols of the time slot. That is, a device (e.g., a vehicle) may not be aware that there are no packets in the time slot. For instance, the vehicle may be unaware of the presence of the data packets before decoding the SCI. Performing baseband processing procedures may increase power consumption at the vehicle and in some cases, may damage the device hardware in thermal conditions. As such, the device may attempt to decode the PSSCH (e.g., perform RF and baseband processing) when no PSSCH packets are present, resulting in excess power consumption and possible damage to device hardware. In the case of LTE C-V2X, a UE (e.g., UE 215-a, UE 215-b, or UE 215-c) may detect energy on a first few OFDM symbols of a time slot and perform early shut down techniques to conserve or reduce power consumption. However, because the PSCCH is spread across all or a majority of the OFDM symbols of a time slot, the UE may miss a portion of control information resulting in performance degradation.

One or more aspects of the present disclosure provides for a wireless communications system (e.g., wireless communications system 200) that support techniques for receive power savings during NR sidelink communications. For example, a UE 215-a may receive the SCI 225 from UE 215-a and/or UE 215-b. The SCI 225 may be received over a portion of a time slot. For example, the SCI 225 may be received over the first two or three OFDM symbols of the time slot. After processing the portion of the time slot containing the SCI 225, the UE 215-a may determine if data packets are present or if the SCI 225 was decoded successfully. That is, the UE 215-a may determine whether or not the UE 215-a will receive data packets from other UEs (e.g., the UE 215-b and/or the UE 215-c). If the UE 215-a determines that data packets are not present, the UE 215-a may utilize a sidelink power savings manager 230. The sidelink power savings manager 230 may allow the UE 215-a to shut down or disable components or processes related to processing data packets on the remaining OFDM symbols of the time slot (e.g., symbols after reception of the SCI 225). For example, the sidelink power savings manager 230 may enable the UE 215-a to disable one or more RF components such as a mixer, an antenna, or an amplifier. Additionally or alternatively, the sidelink power savings manager 230 may enable the UE 215-a to disable baseband processing procedures such as channel estimation. The UE 215-a may determine whether or not data packets are present or whether or not the SCI 225 is decoded successfully in a multitude of ways.

In one example, the UE 215-a may determine an RSSI of the first portion of the time slot (e.g., the first two or three symbols over which the PSCCH is received) and compare the determined RSSI to a first threshold. In some examples, if the RSSI is above the first threshold, the UE 215-a may determine that data packets are present. Additionally or alternatively, if the RSSI is below the first threshold, the UE 215-a may determine that data packets are not present. In another example, the UE 215-a may determine an RSRP utilizing one or more reference signals (e.g., DMRS) received over the first portion of the time slot and compare the RSRP to a second threshold. If the RSRP is above the second threshold, the UE 215-a may determine that data packets are present and if the RSRP is below the second threshold, the UE 215-a may determine that data packets are not present. In yet another example, the UE 215-a may determine a DMRS correlation and determine whether data packets are present based on the DMRS correlation. In some examples, the UE 215-a may determine the DMRS correlation based on an antenna port, a DMRS OFDM symbol, a sample index, the received DMRS or a combination thereof. By disabling procedures related to processing data packets when no data packets are present, a UE 215 may reduce power consumption during V2X suspension which may reduce device hardware damage.

In some examples, a UE 215-a may receive multiple PSCCH candidates, where each PSCCH candidate corresponds to a different subchannel. Additionally or alternatively, each subchannel may span a different frequency range. In some examples, the UE 215-a may fail to decode the SCI 225 associated with one or more PSCCH candidates (e.g., based on RSSI, RSRP, or DMRS correlation) and determine to shut down or disable one or more RF components or baseband processing on the remaining symbols in the time slot of each subchannel. Alternatively, the UE 215-a may fail to decode all of the SCI 225 associated with all of the PSCCH candidates and determine to shut down or disable one or more RF components or baseband processing procedures over the remaining symbols of the time slot of each subchannel.

Figure 3A:
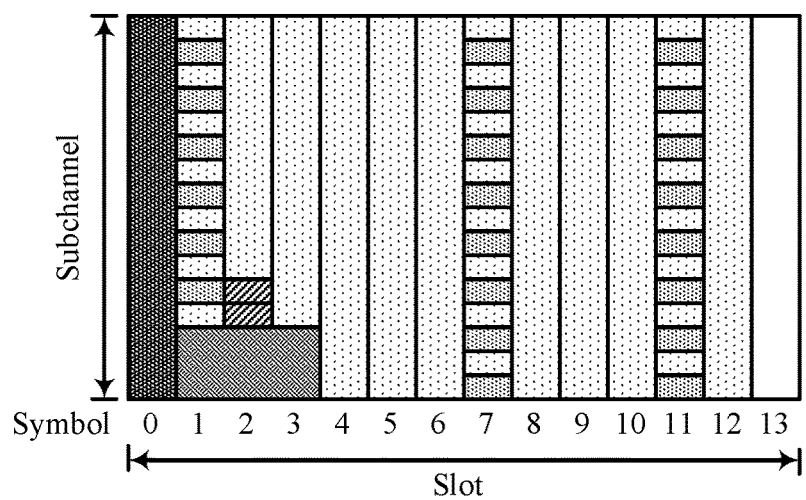
FIG. 3A and FIG. 3B illustrate examples of slot formats that support techniques for power saving in sidelink communications in accordance with aspects of the present disclosure.
Figure 3A:
Figure 3B:
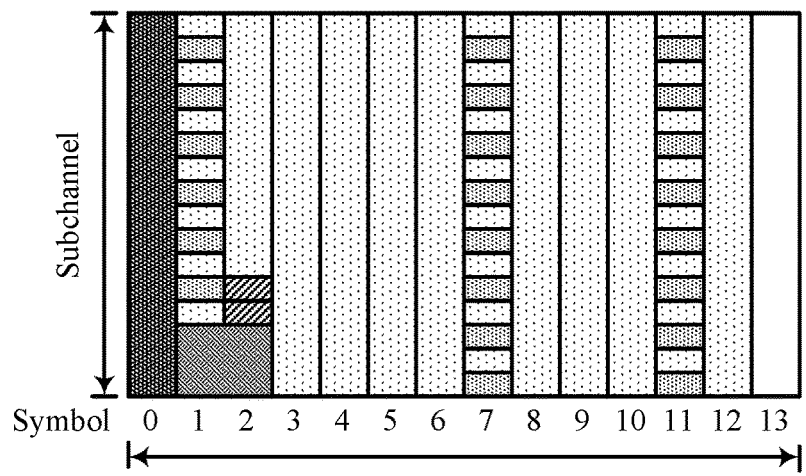
Figure 3B:

FIGS. 3A and 3B illustrate examples of slot structures 301 and 302 that support techniques for power saving in sidelink communications in accordance with aspects of the present disclosure. In some examples, the slot structure 301 and the slot structure 302 may implement aspects of wireless communications systems 100 and 200 as described with reference to FIGS. 1 and 2. For example, the slot structure 301 and the slot structure 302 may include signals received by a UE (e.g., a vehicle), which may be an example of a UE 115 with reference to FIGS. 1 and 2.

As described with reference to FIG. 2, a UE may receive an SCI on the PSCCH, where the PSCCH may be received over a first portion of symbols of a time slot. In some examples, the UE may decode the PSCCH and determine to disable or shutdown one or more RF components or baseband processing procedures for the remaining symbols of the time slot based on the decoding. As illustrated in the examples of FIGS. 3A and 3B, the first symbol of a time slot (symbol 0) may be reserved for an automatic gain control (AGC) 305 and the last symbol of the time slot (symbol 13) may be reserved for a gap symbol. The AGC 305 (e.g., AGC 305-a and AGC 305-b) ensures that received signals are amplified to a level that allows for efficient processing.

In FIG. 3A, the UE may receive the SCI over the PSCCH and the SCI may be received over three symbols (e.g., symbols 1, 2, and 3). The UE may receive two SCIs, a first SCI (e.g., SCI-1 310-a) and a second SCI (e.g., SCI-2 315-a). In some examples, the SCI-2 315-a may be carried within the resource allocation of the PSSCH 325-a. In some examples, the UE may perform a decoding procedure on the SCI-1 310-a and the SCI-2 315-a, and determine an outcome of the decoding procedure. For example, the UE may determine that the control channel decoding has failed or may determine that there are no data packets present on the PSSCH 325-a. The UE may also receive one or more reference signals (e.g., DMRS 320-a) on symbol 1 of the time slot. If the UE determines a control channel decoding failure, the UE may determine to shut down one or more RF components or baseband processing operations for the remaining symbols of the time slot (e.g., symbols 4 through symbol 12 in the example of FIG. 3A). That is, the UE may not receive one or more reference signals on symbols 7 and 11 as well as any data packets on symbols 4 through 12. Additionally or alternatively, the UE may not perform baseband processing procedures such as channel estimation procedures, time and frequency-domain synchronization procedures, demodulation procedures, decoding procedures on symbols 4 through 12.

The UE may determine the outcome of the decoding procedure utilizing a few different techniques. Using a first technique, the UE may determine an RSSI of the first subset of symbols (e.g., symbols 1 through 3) and compare the RSSI to a first threshold. If the RSSI satisfies the first threshold, the UE may determine that the decoding procedure is successful. In such instances, the UE may determine the presence of PSSCH packets. If the RSSI does not satisfy the first threshold, the UE may determine an unsuccessful decoding outcome and/or may determine the absence of PSSCH packets. Additionally or alternatively, the UE may determine an RSRP of the first few symbols (e.g., symbols 1 through 3) and compare the RSRP to a second threshold. If the RSRP satisfies the second threshold, the UE may determine a successful decoding outcome or may determine the presence of PSSCH packets. If the RSRP does not satisfy the first threshold, the UE may determine an unsuccessful decoding outcome or may determine the absence of PSSCH packets. In some examples, the first threshold and/or the second threshold may be configured via RRC signaling. Using another technique, the UE may determine a DMRS correlation. That is, the UE may utilize the one or more received DMRS 320-a on symbol 1 to determine a decoding outcome. The DMRS correlation may be calculated using Equation 1 where p is the antenna port, k is the DMRS OFDM symbol, i is the sample index, and y is the received DMRS signal.

$$\sum_p \sum_i (r_k(i)) * y_k^p(i) \qquad (1)$$

In FIG. 3B, the UE may receive SCI over the PSCCH and the SCI may be received over two symbols (e.g., symbols 1 and 2). The UE may receive two SCIs, a first SCI (e.g., SCI-1 310-b) and a second SCI (e.g., SCI-2 315-b). In some examples, the SCI-2 315-b may be carried within the resource allocation of the PSSCH 325-b. In some examples, the UE may perform a decoding procedure on SCI-1 310-b and SCI-2 315-b, and determine an outcome of the decoding procedure. For example, the UE may determine that the control channel decoding has failed or may determine that there are no data packets present on the PSSCH 325-b. The UE may also decode one or more reference signals (e.g., DMRS 320-b) received on symbol 1 of the time slot. If the UE determines a control channel decoding failure, the UE may determine to shut down one or more RF components or baseband processing operations for the remaining symbols of the time slot (e.g., symbols 3 through symbol 12 in the example of FIG. 3B). That is, the UE may not receive one or more reference signals on symbols 7 and 11 as well as any data packets on symbols 3 through 12 or the UE may not perform baseband processing procedures such as channel estimation procedures, time and frequency-domain synchronization procedures, demodulation procedures, decoding procedures on symbols 3 through 12.

As depicted herein, the UE may determine the outcome of the decoding procedure utilizing a few different techniques. Using a first technique, the UE may determine an RSSI of the first subset of symbols (e.g., symbols 1 through 2) and compare the RSSI to a first threshold. If the RSSI satisfies the first threshold, the UE may determine a successful decoding outcome and/or may determine the presence of PSSCH packets. If the RSSI does not satisfy the first threshold, the UE may determine an unsuccessful decoding outcome and/or may determine the absence of PSSCH packets. Additionally or alternatively, the UE may determine an RSRP of the first subset of symbols (e.g., symbols 1 through 2) and compare the RSRP to a second threshold. If the RSRP satisfies the second threshold, the UE may determine a successful decoding outcome or may determine the presence of PSSCH packets. If the RSRP does not satisfy the first threshold, the UE may determine an unsuccessful decoding outcome or may determine the absence of PSSCH packets. In some examples, the first threshold and/or the second threshold may be configured via RRC signaling. Using another technique, the UE may determine a DMRS correlation. That is, the UE may utilize the received one or more DMRS 320-b on symbol 1 to determine a decoding outcome. The DMRS correlation may be calculated using Equation 1 as described with reference to FIG. 3A.

Figure 4:
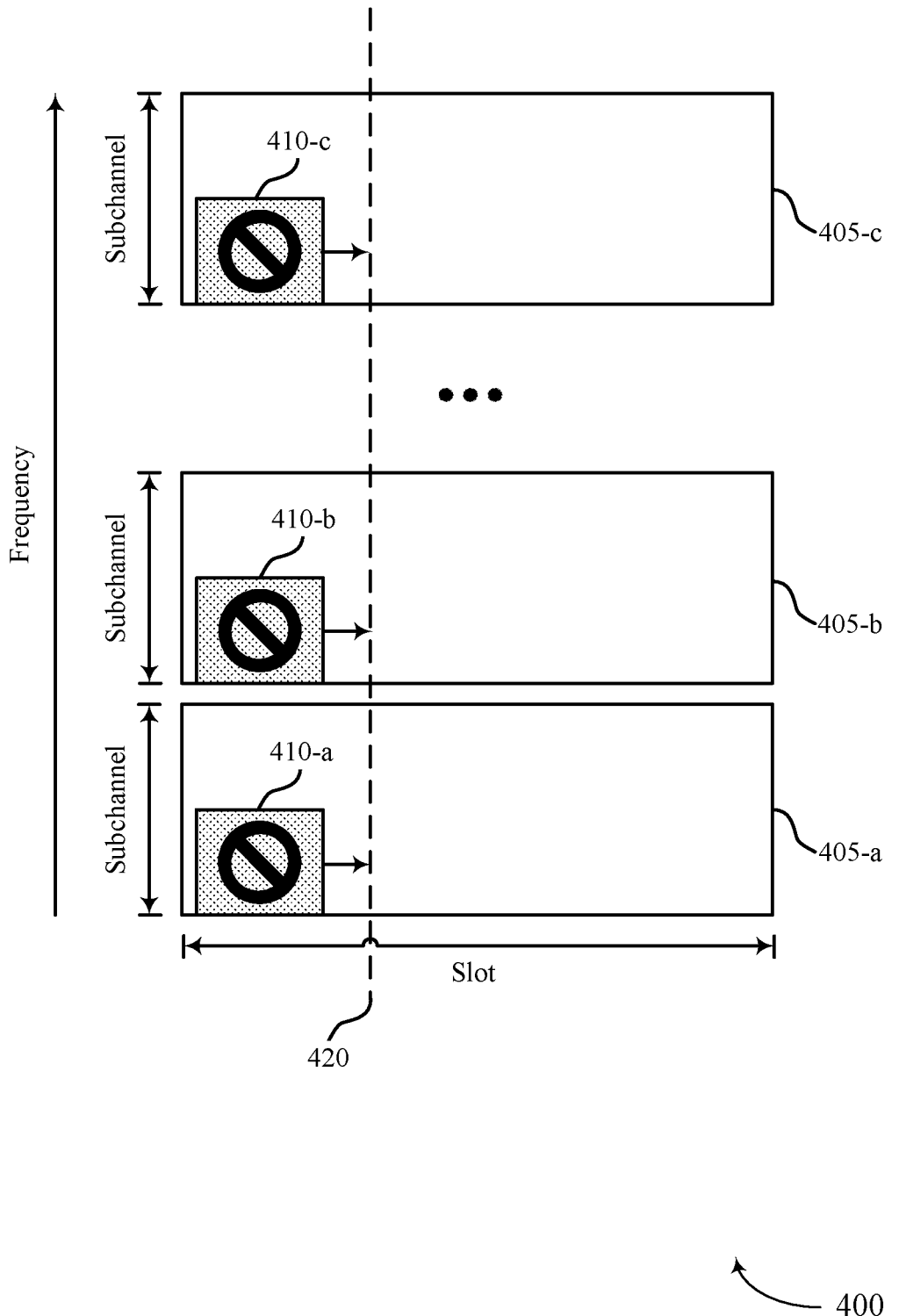
FIG. 4 illustrates an example of a multiple physical sidelink control channel (PSCCH) candidate slot structure that supports techniques for power saving in sidelink communications in accordance with aspects of the present disclosure.

FIG. 4 illustrates an example of a multiple PSCCH candidate slot format 400 that supports techniques for power saving in sidelink communications in accordance with aspects of the present disclosure. In some examples, the multiple PSCCH candidate slot format 400 may implement aspects of wireless communications systems 100 and 200 as described in FIGS. 1 and 2, and a slot structure 301 and a slot structure 302 as described in FIG. 3. For example, the multiple PSCCH candidate slot format 400 may include signals received by a UE, which may be an example of a UE 115 with reference to FIGS. 1 through 3. As described with reference to FIGS. 2 and 3, a UE may receive an SCI over a first portion of a time slot (e.g., first two or three symbols). The UE may decode the SCI and determine to shut down or suspend one or more RF components or baseband processing procedures for the remaining symbols of the slot based on the outcome of decoding the SCI. As depicted herein, the baseband processing may include at least one of a channel estimation procedure, a time and frequency-domain synchronization procedure, a demodulation procedure, a decoding procedure, or a combination thereof.

In some examples, the UE may receive multiple PSCCH candidates 410, where each PSCCH candidate 410 corresponds to a different subchannel 405. For example, the UE may receive a PSCCH candidate 410-a over a subchannel 405-a, a PSCCH candidate 410-b over a subchannel 405-b, and a PSCCH candidate 410-c over a subchannel 405-c. In some examples, the subchannels 405 may span different frequency resources. Additionally or alternatively, two or more of the subchannels 405 may span overlapping frequency or may share frequency resources. The PSCCH candidate 410 of each subchannel 405 may include the SCI associated with a corresponding time slot, and the SCI may be received over a first subset of symbols of the time slot (e.g., first two or three symbols of the time slot).

In some examples, the UE may determine a decoding outcome of all PSCCH candidates 410. The UE may determine whether the decoding outcome is successful or unsuccessful. The UE may determine the decoding outcome of each PSCCH candidate 410 by determining an RSSI, an RSRP, and/or a DMRS correlation as described with reference to FIGS. 2 and 3. In some examples, the UE may determine to shut down or disable one or more RF components or baseband processing after a time 420 (e.g., all remaining symbols of the slot) if one or more PSCCH candidates 410 are decoded unsuccessfully. For example, the UE may determine at least one PSCCH candidate (e.g., PSCCH candidate 410-c) was decoded unsuccessfully and may disable baseband processing or one or more RF components for all remaining symbols of the slot across all PSCCH candidates 410. Additionally or alternatively, the UE may determine to shut down or disable one or more RF components or baseband processing after the time 420 (e.g., all remaining symbols of the slot) if all PSCCH candidates 410 are decoded unsuccessfully. For example, the UE may determine that at least one of the PSCCH candidate 410-a, the PSCCH candidate 410-b, and the PSCCH candidate 410-c was decoded unsuccessfully, and may disable baseband processing or one or more RF components for all remaining symbols of the slot across all PSCCH candidates 410. By disabling processes related to receiving a PSSCH (e.g., baseband processing procedures or RF components), a UE may conserve power consumption. For example, if 9 or 10 OFDM symbols are shutdown in a time slot, the UE may save an average of 70% power (e.g., reduced from 110 mW to 33 mW).

Figure 5:
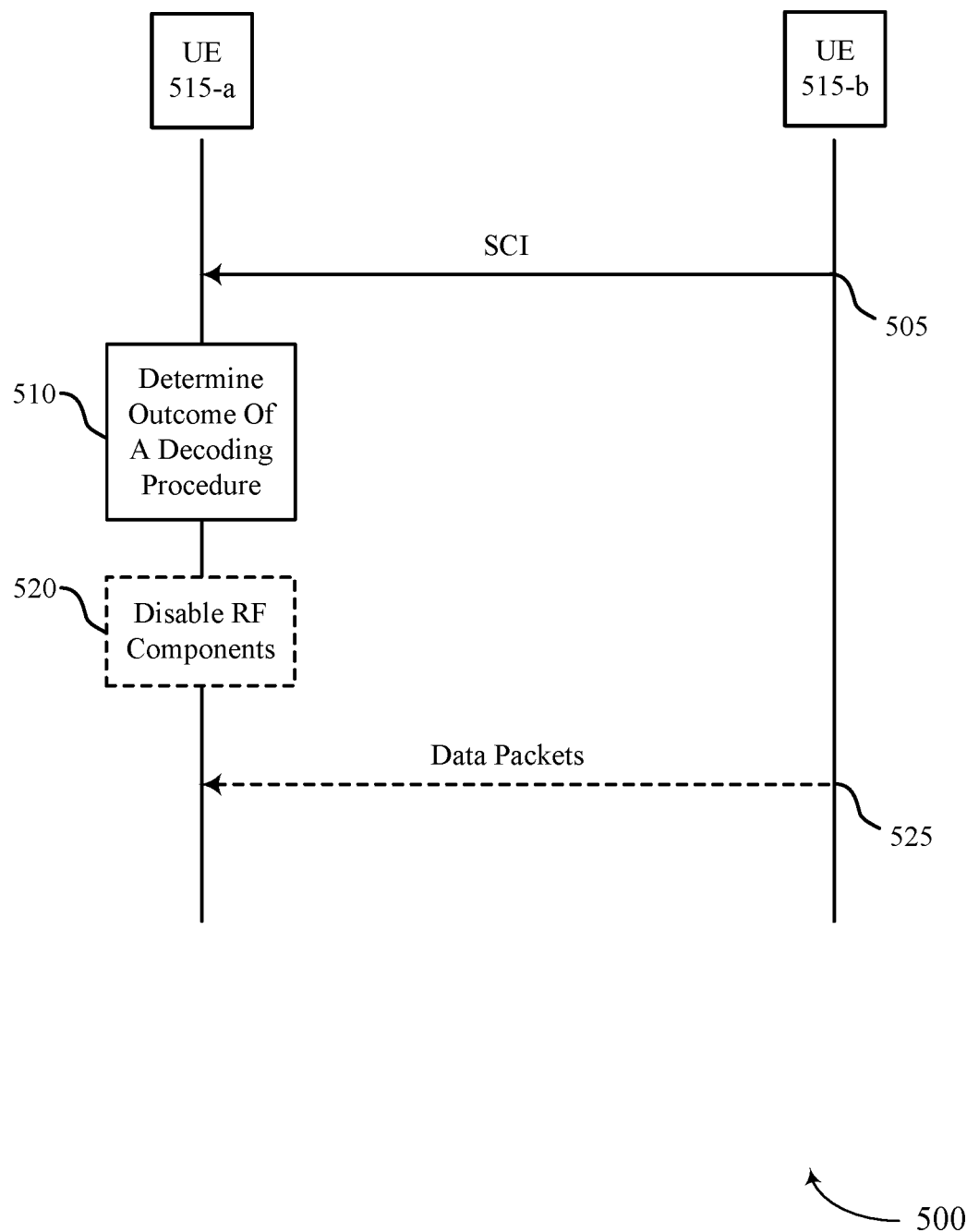
FIG. 5 illustrates an example of a process flow that supports techniques for power saving in sidelink communications in accordance with aspects of the present disclosure.

FIG. 5 illustrates an example of a process flow 500 that supports techniques for power saving in sidelink communications in accordance with aspects of the present disclosure. In some examples, the process flow 500 may implement aspects of wireless communications systems 100 and 200 as described in FIGS. 1 and 2, a slot structure 301 and a slot structure 302 as described in FIGS. 3A and 3B, and a multiple PSCCH candidate slot format 400 as described in FIG. 4. For example, the process flow 500 may include a UE 515-a and a UE 515-b which may be examples of a UE 115 as described with reference to FIGS. 1 through 4. It should be noted that the UE 515-a and the UE 515-b may not be limited to mobile devices, but may be examples of a VUE, a laptop, or any other wireless device. The process flow 500 may be implemented by the UE 515-a and the UE 515-b for reduced power consumption, and may promote low latency and low interference for wireless communications supporting high priority channels, among other benefits.

In the following description of the process flow 500, the operations between the UE 515-a and the UE 515-b may be transmitted in a different order than the example order shown, or the operations performed by the UE 515-a and the UE 515-b may be performed in different orders or at different times. Some operations may also be omitted from the process flow 500, and other operations may be added to the process flow 500. As depicted herein, a UE may receive an SCI over a first subset (e.g., two or three) of symbols in a time slot and determine to shut down or disable RF components or baseband processing procedures associated a remaining number of symbols of the slot based on a decoding outcome of the SCI.

At 505, a UE 515-a may receive an SCI from a UE 515-b. The UE 515-a may receive a first SCI (SCI-1) and a second SCI (SCI-2). The SCI may carry information the UE 515-a may utilize to receive and demodulate a PSSCH (e.g., data packets received on the PSSCH). In some examples, the SCI may be received on a first portion of a time slot (e.g., first two or three symbols of the time slot). The UE 515-a may also receive one or more reference signals. (e.g., DMRS) during the first portion of the time slot.

At 510, the UE 515-a may decode the sidelink control channel and may determine a decoding outcome of the received SCI. The UE may determine whether the decoding outcome is successful or unsuccessful. In some examples, based on an unsuccessful decoding outcome, the UE may determine that there are no packets present on the PSSCH. For example, the UE may determine that there are no packets present on the PSSCH when sidelink communications are suspended during thermal conditions. A successful decoding outcome may indicate that packets on present on the PSCCH. For example, the UE may determine that there are packets present on the PSSCH during normal operating temperatures.

In some examples, the UE 515-a may determine an unsuccessful decoding outcome by comparing an RSSI or an RSRP of the first portion of the time slot (e.g., first few symbol used to receive the PSCCH) to respective thresholds. If the RSSI or the RSRP satisfy their respective thresholds, the UE 515-a may determine a successful decoding outcome, whereas if the RSSI or the RSRP do not satisfy their respective thresholds, the UE 515-a may determine an unsuccessful decoding outcome. Alternatively or additionally, the UE 515-a may determine a DMRS correlation from the one or more received reference signals and determine the outcome of the decoding based on the DMRS correlation.

At 520, the UE 515-a may determine to disable one or more RF components during a second set (e.g., remaining) of symbols of the time slot (e.g., symbols after the first portion of the time slot). The UE 515-a may determine to disable the one or more RF components based on determining an unsuccessful decoding outcome at 510. Some examples of the one or more RF components may be mixers, power amplifiers, demodulators/modulators, antennas, duplexers, filters, etc. In some examples, the UE 515-a may determine to disable one or more baseband processing procedure on the remaining symbols of the time slot if the decoding outcome is unsuccessful. Some baseband procedure may include time and frequency-domain synchronization, channel estimation, demodulation, decoding, or the like.

At 525, the UE 515-a may receive one or more data packets over the PSSCH from the UE 515-b. In some examples, one or more RF components or one or more baseband processing procedures may be disabled at the UE 515-a and the UE 515-b may not receive and/or decode the data packets from the UE 515-b. In other examples, sidelink communication may be suspended and the UE 515-b may not transmit one or more data packets to the UE 515-a.

Figure 6:
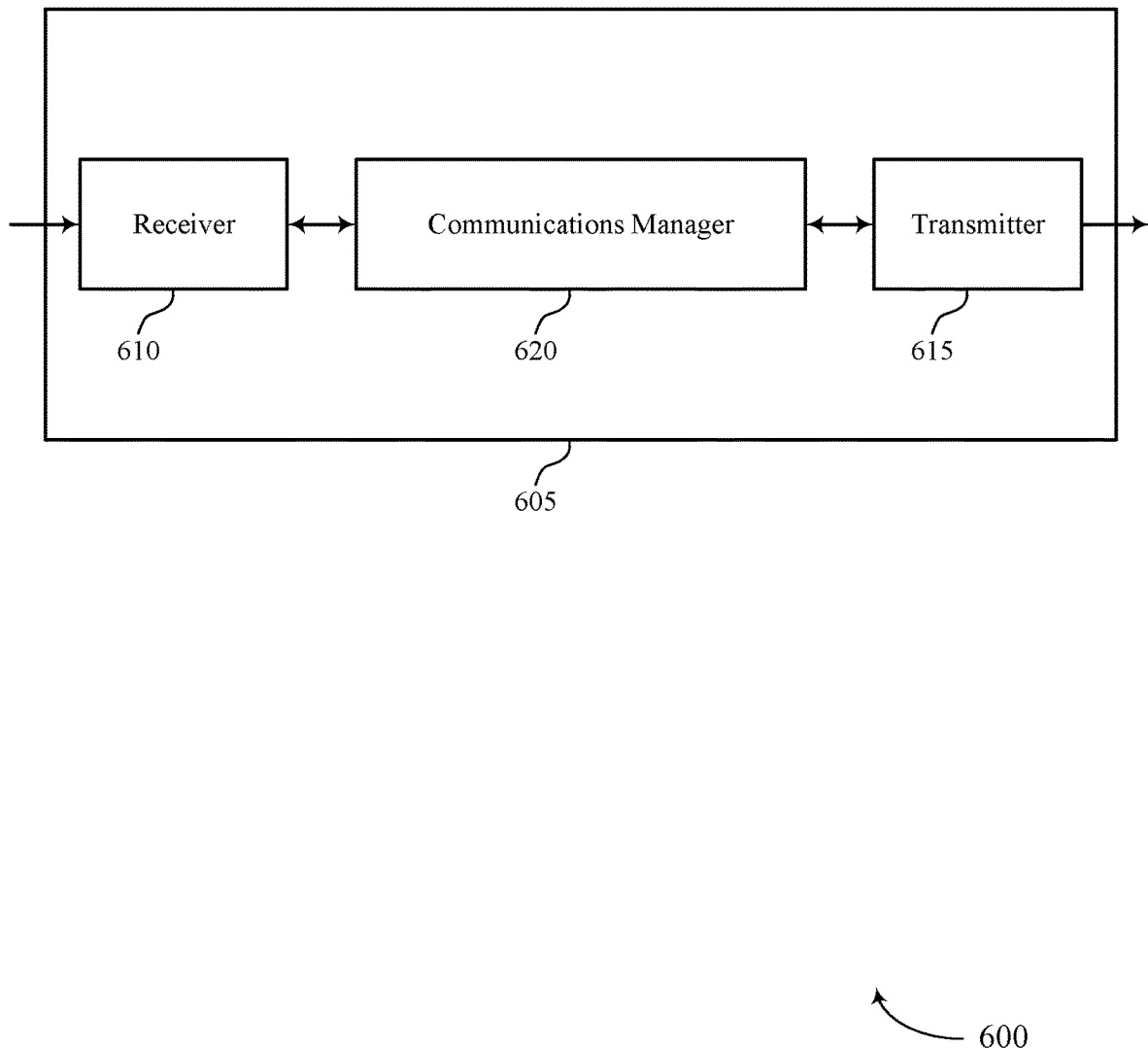
FIGS. 6 and 7 show block diagrams of devices that support techniques for power saving in sidelink communications in accordance with aspects of the present disclosure.

FIG. 6 shows a block diagram 600 of a device 605 that supports techniques for power saving in sidelink communications in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for power saving in sidelink communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for power saving in sidelink communications). In some examples, the transmitter 615 may be co-located with a receiver 610 in a transceiver component. The transmitter 615 may utilize a single antenna or a set of multiple antennas.

The communications manager 620, the receiver 610, the transmitter 615, or various combinations thereof or various components thereof may be examples of means for performing various aspects of techniques for power saving in sidelink communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

For example, the communications manager 620 may be configured as or otherwise support a means for receiving, on a first set of symbols of a time slot, a sidelink control channel for a sidelink transmission. The communications manager 620 may be configured as or otherwise support a means for decoding the sidelink control channel. The communications manager 620 may be configured as or otherwise support a means for disabling one or more radio frequency components associated with processing the sidelink transmission on a second set of symbols of the time slot based on decoding the sidelink control channel.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced power consumption. For example, by disabling operations related to receiving or processing a PSSCH (e.g., RF components or processing operations) in situations where a PSCCH is decoded unsuccessfully, the device 605 may reduce overall power usage. In addition, by constraining a SCI to the first subset of symbols of a time slot, the device 605 may disable RF components or baseband processing procedure over the remaining slots without missing control information thereby increasing performance and reliability.

Figure 7:
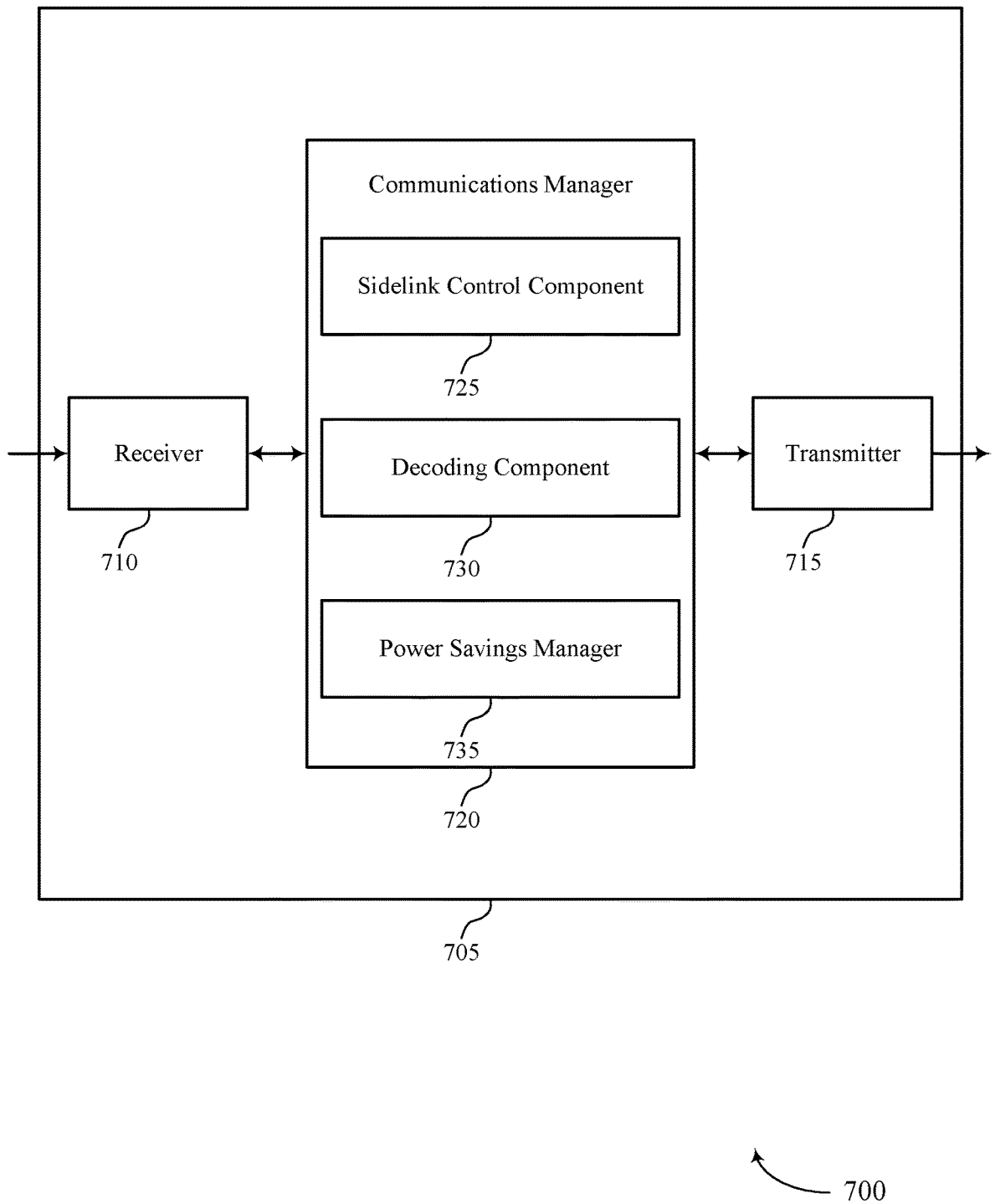

FIG. 7 shows a block diagram 700 of a device 705 that supports techniques for power saving in sidelink communications in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for power saving in sidelink communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for power saving in sidelink communications). In some examples, the transmitter 715 may be co-located with a receiver 710 in a transceiver component. The transmitter 715 may utilize a single antenna or a set of multiple antennas.

The device 705, or various components thereof, may be an example of means for performing various aspects of techniques for power saving in sidelink communications as described herein. For example, the communications manager 720 may include a sidelink control component 725, a decoding component 730, a power savings manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The sidelink control component 725 may be configured as or otherwise support a means for receiving, on a first set of symbols of a time slot, a sidelink control channel for a sidelink transmission. The decoding component 730 may be configured as or otherwise support a means for decoding the sidelink control channel. The power savings manager 735 may be configured as or otherwise support a means for disabling one or more radio frequency components associated with processing the sidelink transmission on a second set of symbols of the time slot based on decoding the sidelink control channel.

Figure 8:
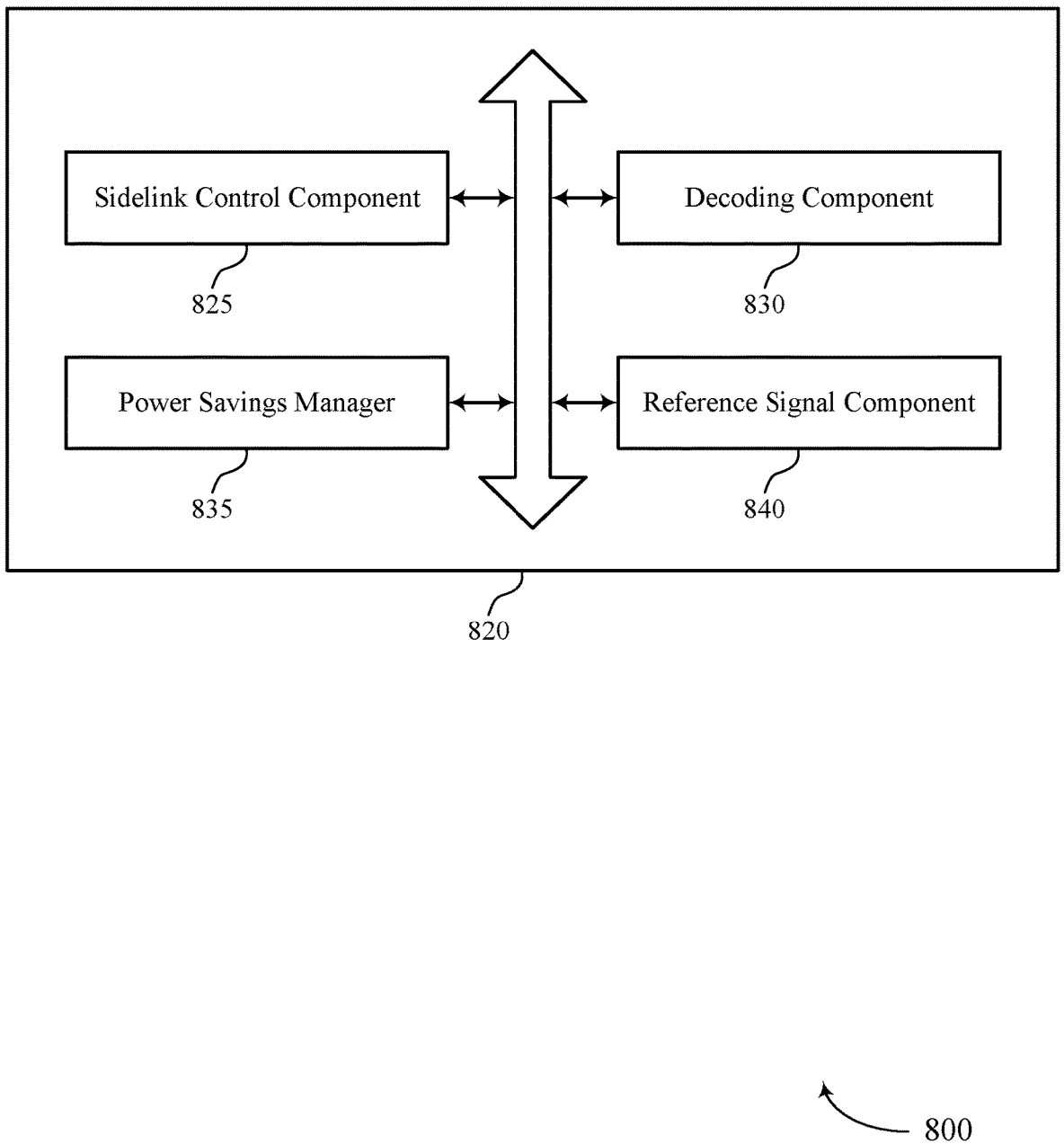
FIG. 8 shows a block diagram of a communications manager that supports techniques for power saving in sidelink communications in accordance with aspects of the present disclosure.

FIG. 8 shows a block diagram 800 of a communications manager 820 that supports techniques for power saving in sidelink communications in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for power saving in sidelink communications as described herein. For example, the communications manager 820 may include a sidelink control component 825, a decoding component 830, a power savings manager 835, a reference signal component 840, or any combination thereof. Each of these components may communicate, directly or indirectly, with one another (e.g., via one or more buses).

The sidelink control component 825 may be configured as or otherwise support a means for receiving, on a first set of symbols of a time slot, a sidelink control channel for a sidelink transmission. The decoding component 830 may be configured as or otherwise support a means for decoding the sidelink control channel. The power savings manager 835 may be configured as or otherwise support a means for disabling one or more radio frequency components associated with processing the sidelink transmission on a second set of symbols of the time slot based on decoding the sidelink control channel.

In some examples, the power savings manager 835 may be configured as or otherwise support a means for comparing a RSSI associated with the sidelink control channel to a threshold. In some examples, the power savings manager 835 may be configured as or otherwise support a means for determining that the RSSI associated with the sidelink control channel satisfies the threshold based on the comparing, where disabling the one or more radio frequency components is based on the RSSI associated with the sidelink control channel satisfying the threshold.

In some examples, the power savings manager 835 may be configured as or otherwise support a means for comparing a RSRP associated with the sidelink control channel to a threshold. In some examples, the power savings manager 835 may be configured as or otherwise support a means for determining that the RSRP associated with the sidelink control channel satisfies the threshold based on the comparing, where disabling the one or more radio frequency components is based on the RSRP associated with the sidelink control channel satisfying the threshold.

In some examples, to support receiving the sidelink control channel for the sidelink transmission, the sidelink control component 825 may be configured as or otherwise support a means for receiving, on a first subchannel associated with the first set of symbols, a first sidelink control channel candidate associated with the sidelink transmission. In some examples, to support receiving the sidelink control channel for the sidelink transmission, the sidelink control component 825 may be configured as or otherwise support a means for receiving, on a second subchannel associated with the first set of symbols, a second sidelink control channel candidate associated with the sidelink transmission.

In some examples, the power savings manager 835 may be configured as or otherwise support a means for determining that a decoding procedure is unsuccessful for at least one of the first sidelink control channel candidate, the second sidelink control channel candidate, or both, where disabling the one or more radio frequency components is based on determining that the decoding procedure is unsuccessful.

In some examples, the reference signal component 840 may be configured as or otherwise support a means for receiving, on a third set of symbols of the time slot, a DMRS associated with the sidelink transmission. In some examples, the power savings manager 835 may be configured as or otherwise support a means for determining a DMRS correlation based on the received DMRS, where disabling the one or more radio frequency components is based on the determined DMRS correlation.

In some examples, the DMRS correlation is determined based on an antenna port, a DMRS OFDM symbol, a sample index, the received DMRS, or a combination thereof. In some examples, to support disabling the one or more radio frequency components, the power savings manager 835 may be configured as or otherwise support a means for disabling a baseband processing on the second set of symbols of the time slot based on decoding the sidelink control channel.

In some examples, the baseband processing includes at least one of a channel estimation procedure, a time and frequency-domain synchronization procedure, a demodulation procedure, a decoding procedure, or a combination thereof. In some examples, the one or more radio frequency components include at least one of an antenna, a mixer, an amplifier, or a combination thereof.

In some examples, the first set of symbols includes two OFDM symbols or three OFDM symbols. In some examples, the sidelink control channel includes at least one of a first sidelink control information, a second sidelink control information, or a combination thereof.

Figure 9:
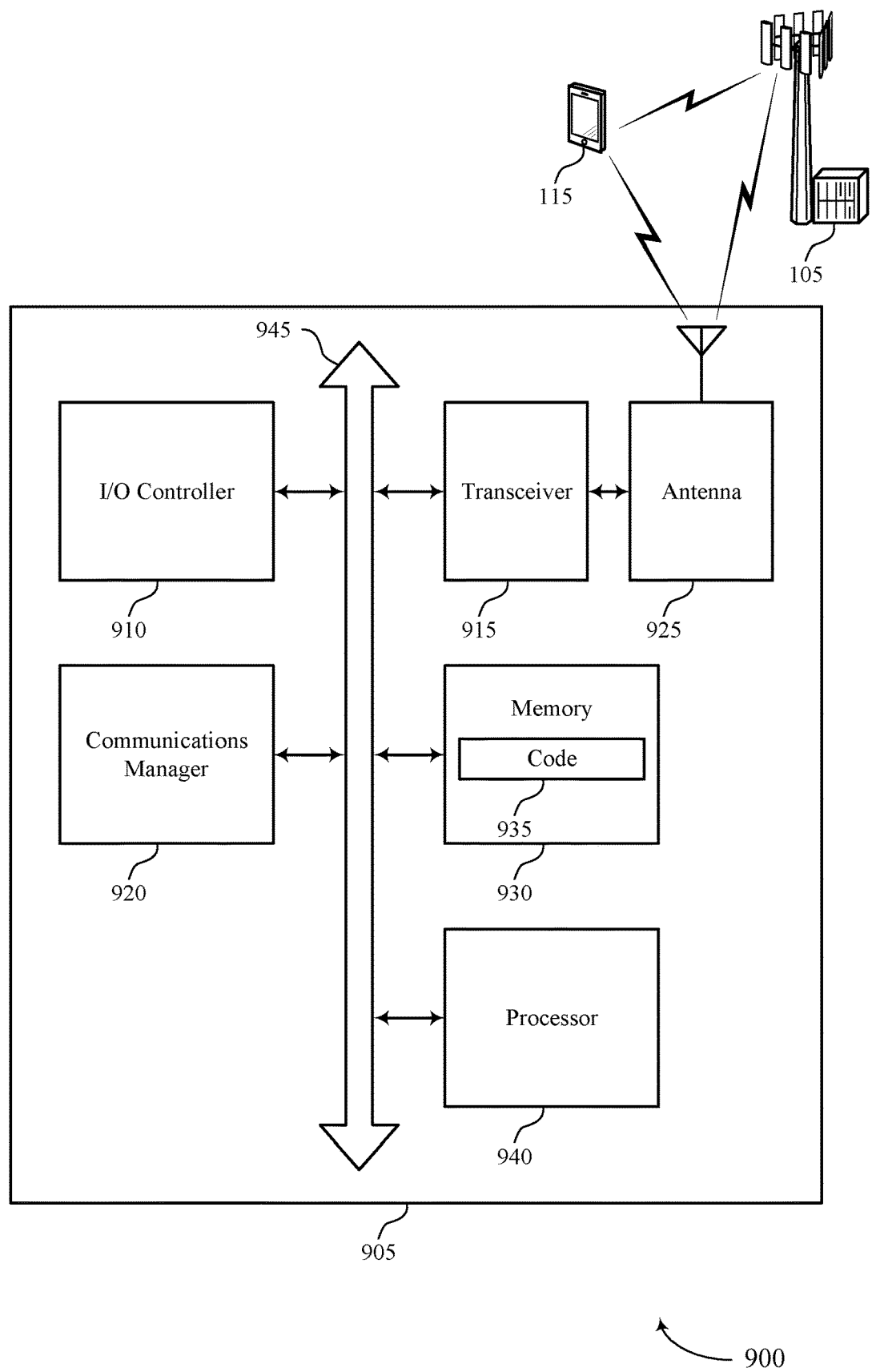
FIG. 9 shows a diagram of a system including a device that supports techniques for power saving in sidelink communications in accordance with aspects of the present disclosure.

FIG. 9 shows a diagram of a system 900 including a device 905 that supports techniques for power saving in sidelink communications in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for power saving in sidelink communications). For example, the device 905 or a component of the device 905 may include a processor 940 and memory 930 coupled to the processor 940, the processor 940 and memory 930 configured to perform various functions described herein.

For example, the communications manager 920 may be configured as or otherwise support a means for receiving, on a first set of symbols of a time slot, a sidelink control channel for a sidelink transmission. The communications manager 920 may be configured as or otherwise support a means for decoding the sidelink control channel. The communications manager 920 may be configured as or otherwise support a means for disabling one or more radio frequency components associated with processing the sidelink transmission on a second set of symbols of the time slot based on decoding the sidelink control channel.

By including or configuring the communications manager 920 in accordance with examples as described herein, the device 905 may support techniques for reduced processing and reduced power consumption. For example, by disabling one or more RF components or baseband processing procedures after decoding SCI on the first subset (e.g., two or three) symbols of the time slot, a device 905 may not process signals on the remaining number of symbols of the time slot which may reduce power consumption related to signal processing at the device 905.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for power saving in sidelink communications as described herein, or the processor 940 and the memory 930 may be otherwise configured to perform or support such operations.

Figure 10:
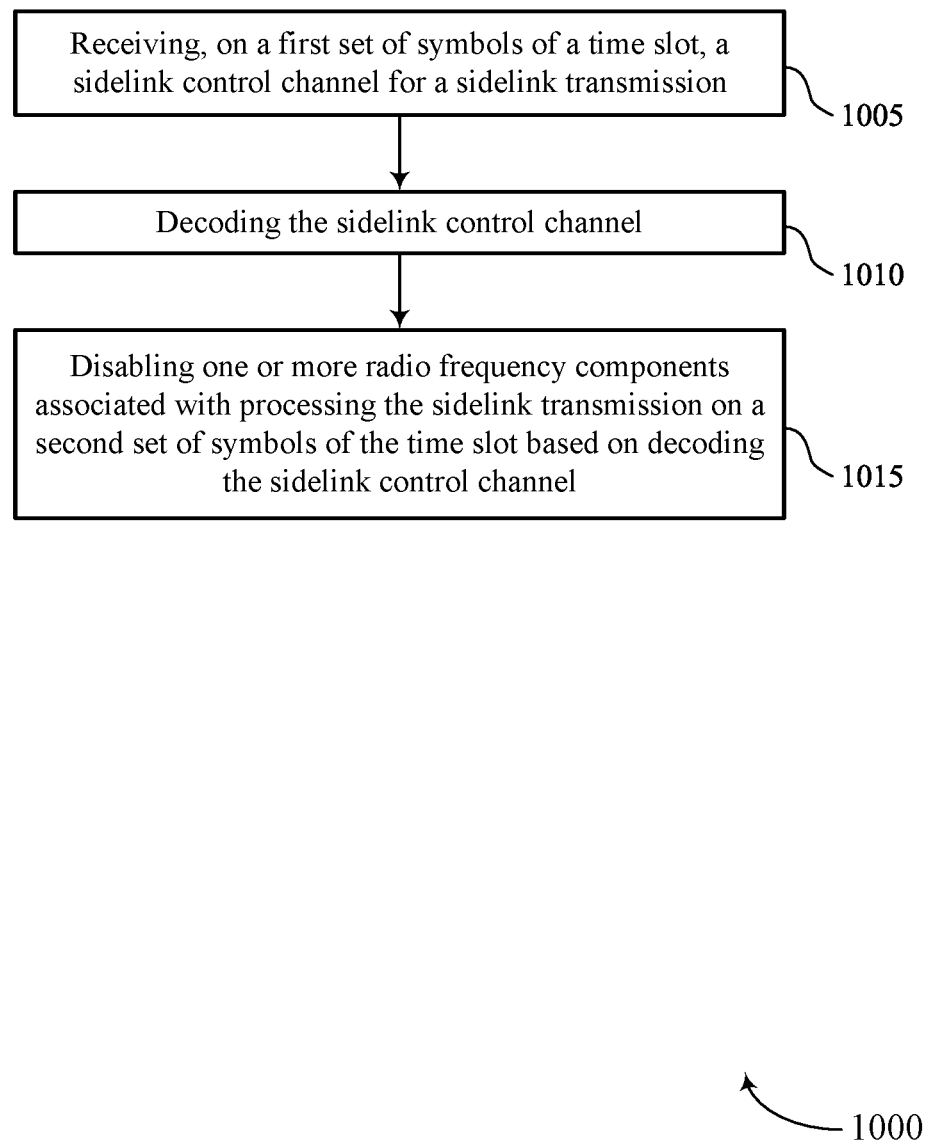
FIGS. 10 and 11 show flowcharts illustrating methods that support techniques for power saving in sidelink communications in accordance with aspects of the present disclosure.

FIG. 10 shows a flowchart illustrating a method 1000 that supports techniques for power saving in sidelink communications in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include receiving, on a first set of symbols of a time slot, a sidelink control channel for a sidelink transmission. The operations of 1005 may be performed in accordance with examples as disclosed herein. In some examples, aspects of the operations of 1005 may be performed by a sidelink control component 825 as described with reference to FIG. 8.

At 1010, the method may include decoding the sidelink control channel. The operations of 1010 may be performed in accordance with examples as disclosed herein. In some examples, aspects of the operations of 1010 may be performed by a decoding component 830 as described with reference to FIG. 8.

At 1015, the method may include disabling one or more radio frequency components associated with processing the sidelink transmission on a second set of symbols of the time slot based on decoding the sidelink control channel. The operations of 1015 may be performed in accordance with examples as disclosed herein. In some examples, aspects of the operations of 1015 may be performed by a power savings manager 835 as described with reference to FIG. 8.

Figure 11:
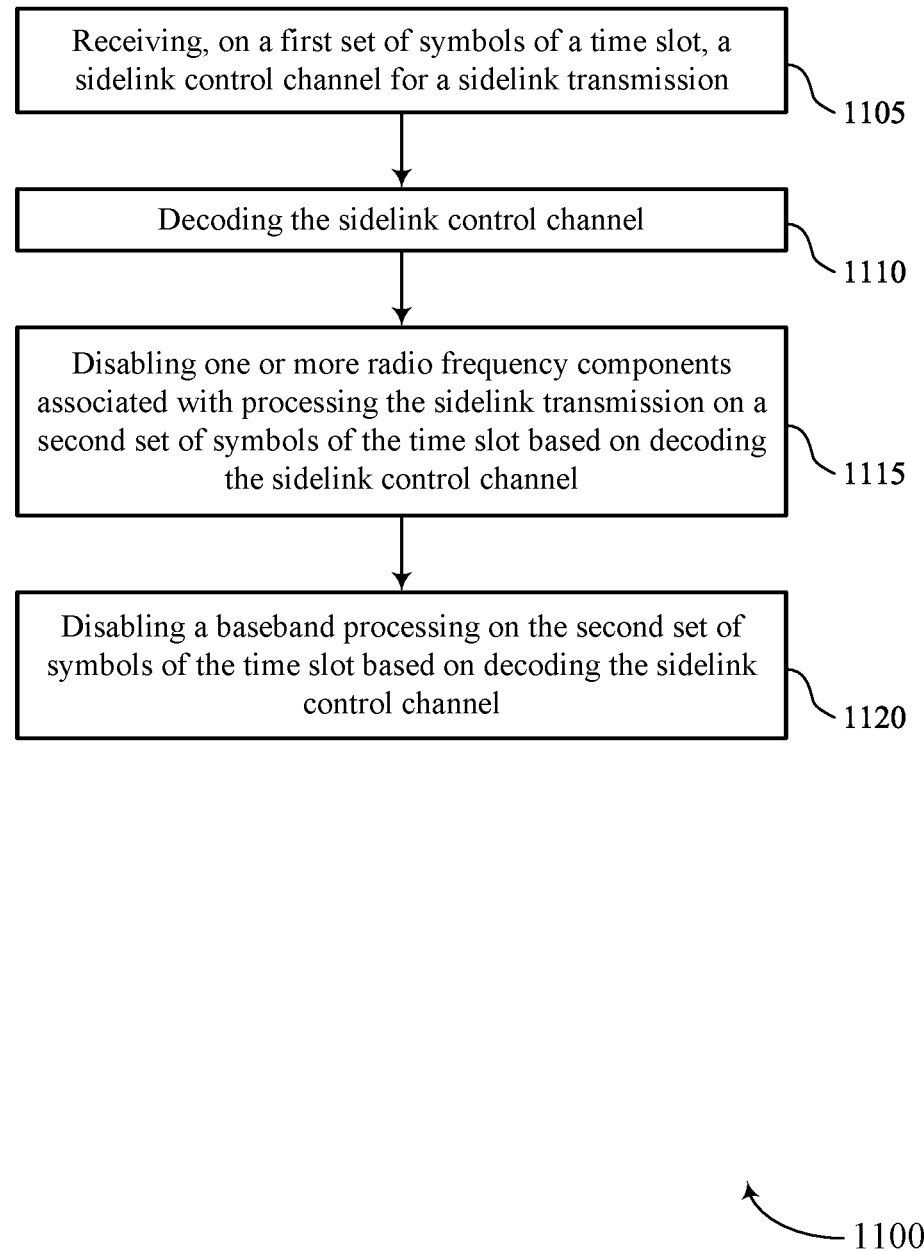

FIG. 11 shows a flowchart illustrating a method 1100 that supports techniques for power saving in sidelink communications in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include receiving, on a first set of symbols of a time slot, a sidelink control channel for a sidelink transmission. The operations of 1105 may be performed in accordance with examples as disclosed herein. In some examples, aspects of the operations of 1105 may be performed by a sidelink control component 825 as described with reference to FIG. 8.

At 1110, the method may include decoding the sidelink control channel. The operations of 1110 may be performed in accordance with examples as disclosed herein. In some examples, aspects of the operations of 1110 may be performed by a decoding component 830 as described with reference to FIG. 8.

At 1115, the method may include disabling one or more radio frequency components associated with processing the sidelink transmission on a second set of symbols of the time slot based on decoding the sidelink control channel. The operations of 1115 may be performed in accordance with examples as disclosed herein. In some examples, aspects of the operations of 1115 may be performed by a power savings manager 835 as described with reference to FIG. 8.

At 1120, the method may include disabling a baseband processing on the second set of symbols of the time slot based on decoding the sidelink control channel. The operations of 1120 may be performed in accordance with examples as disclosed herein. In some examples, aspects of the operations of 1120 may be performed by a power savings manager 835 as described with reference to FIG. 8.

The following provides an overview of aspects of the present disclosure:

Aspect 1: A method for wireless communication at a UE comprising: receiving, on a first set of symbols of a time slot, a sidelink control channel for a sidelink transmission; decoding the sidelink control channel; and disabling one or more RF components associated with processing the sidelink transmission on a second set of symbols of the time slot based at least in part on decoding the sidelink control channel.

Aspect 2: The method of aspect 1, further comprising: comparing a RSSI associated with the sidelink control channel to a threshold; and determining that the RSSI associated with the sidelink control channel satisfies the threshold based at least in part on the comparing, wherein disabling the one or more RF components is based at least in part on the RSSI associated with the sidelink control channel satisfying the threshold.

Aspect 3: The method of any of aspects 1 through 2, further comprising: comparing a RSRP associated with the sidelink control channel to a threshold; and determining that the RSRP associated with the sidelink control channel satisfies the threshold based at least in part on the comparing, wherein disabling the one or more RF components is based at least in part on the RSRP associated with the sidelink control channel satisfying the threshold.

Aspect 4: The method of any of aspects 1 through 3, wherein receiving the sidelink control channel for the sidelink transmission further comprises: receiving, on a first subchannel associated with the first set of symbols, a first sidelink control channel candidate associated with the sidelink transmission; and receiving, on a second subchannel associated with the first set of symbols, a second sidelink control channel candidate associated with the sidelink transmission.

Aspect 5: The method of aspect 4, further comprising: determining that a decoding procedure is unsuccessful for at least one of the first sidelink control channel candidate, the second sidelink control channel candidate, or both, wherein disabling the one or more RF components is based at least in part on determining that the decoding procedure is unsuccessful.

Aspect 6: The method of any of aspects 1 through 5, further comprising: receiving, on a third set of symbols of the time slot, a DMRS associated with the sidelink transmission; and determining a DMRS correlation based at least in part on the received DMRS, wherein disabling the one or more RF components is based at least in part on the determined DMRS correlation.

Aspect 7: The method of aspect 6, wherein the DMRS correlation is determined based at least in part on an antenna port, a DMRS OFDM symbol, a sample index, the received DMRS, or a combination thereof.

Aspect 8: The method of any of aspects 1 through 7, wherein disabling the one or more RF components further comprises: disabling a baseband processing on the second set of symbols of the time slot based at least in part on decoding the sidelink control channel.

Aspect 9: The method of aspect 8, wherein the baseband processing comprises at least one of a channel estimation procedure, a time and frequency-domain synchronization procedure, a demodulation procedure, a decoding procedure, or a combination thereof.

Aspect 10: The method of any of aspects 1 through 9, wherein the one or more RF components comprise at least one of an antenna, a mixer, an amplifier, or a combination thereof.

Aspect 11: The method of any of aspects 1 through 10, wherein the first set of symbols comprises two OFDM symbols or three OFDM symbols.

Aspect 12: The method of any of aspects 1 through 11, wherein the sidelink control channel comprises at least one of a first SCI, a second SCI, or a combination thereof.

Aspect 13: An apparatus comprising a processor; memory coupled with the processor; and instructions stored in the memory and executable by the processor to cause the apparatus to perform a method of any of aspects 1 through 12.

Aspect 14: An apparatus comprising at least one means for performing a method of any of aspects 1 through 12.

Aspect 15: A non-transitory computer-readable medium storing code the code comprising instructions executable by a processor to perform a method of any of aspects 1 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE) comprising:
　　receiving, on a first set of symbols of a time slot, a sidelink control channel for a sidelink transmission;
　　decoding the sidelink control channel based at least in part on receiving the sidelink control channel, wherein decoding the sidelink control channel comprises:
　　　measuring a signal strength of the first set of symbols; and
　　disabling one or more radio frequency components associated with processing the sidelink transmission on a second set of symbols of the time slot based at least in part on the signal strength failing to satisfy a threshold.

2. The method of claim 1, wherein the signal strength comprises a received signal strength indicator, the method further comprising:
  comparing the received signal strength indicator associated with the sidelink control channel to the threshold; and
  determining that the received signal strength indicator associated with the sidelink control channel fails to satisfy the threshold based at least in part on the comparing, wherein disabling the one or more radio frequency components is based at least in part on the received signal strength indicator associated with the sidelink control channel failing to satisfy the threshold.

3. The method of claim 1, wherein the signal strength comprises a reference signal receive power, the method further comprising:
  comparing the reference signal receive power associated with the sidelink control channel to the threshold; and
  determining that the reference signal receive power associated with the sidelink control channel fails to satisfy the threshold based at least in part on the comparing, wherein disabling the one or more radio frequency components is based at least in part on the reference signal receive power associated with the sidelink control channel failing to satisfy the threshold.

4. The method of claim 1, wherein receiving the sidelink control channel for the sidelink transmission further comprises:
  receiving, on a first subchannel associated with the first set of symbols, a first sidelink control channel candidate associated with the sidelink transmission; and
  receiving, on a second subchannel associated with the first set of symbols, a second sidelink control channel candidate associated with the sidelink transmission.

5. The method of claim 4, wherein disabling the one or more radio frequency components is based at least in part on decoding at least one of the first sidelink control channel candidate, the second sidelink control channel candidate, or both.

6. The method of claim 1, further comprising:
  receiving, on a third set of symbols of the time slot, a demodulation reference signal associated with the sidelink transmission; and
  determining a demodulation reference signal correlation based at least in part on the received demodulation reference signal, wherein disabling the one or more radio frequency components is based at least in part on the determined demodulation reference signal correlation.

7. The method of claim 6, wherein the demodulation reference signal correlation is determined based at least in part on an antenna port, a demodulation reference signal orthogonal frequency-division multiplexing symbol, a sample index, the received demodulation reference signal, or a combination thereof.

8. The method of claim 1, wherein disabling the one or more radio frequency components further comprises:
  disabling a baseband processing on the second set of symbols of the time slot based at least in part on decoding the sidelink control channel.

9. The method of claim 8, wherein the baseband processing comprises at least one of a channel estimation procedure, a time and frequency-domain synchronization procedure, a demodulation procedure, a decoding procedure, or a combination thereof.

10. The method of claim 1, wherein the one or more radio frequency components comprise at least one of an antenna, a mixer, an amplifier, or a combination thereof.

11. The method of claim 1, wherein the first set of symbols comprises two orthogonal frequency-division multiplexing symbols or three orthogonal frequency-division multiplexing symbols.

12. The method of claim 1, wherein the sidelink control channel comprises at least one of a first sidelink control information, a second sidelink control information, or a combination thereof.

13. An apparatus, comprising:
  a processor;
  memory coupled with the processor; and
  instructions stored in the memory and executable by the processor to cause the apparatus to:
    receive, on a first set of symbols of a time slot, a sidelink control channel for a sidelink transmission;
    decode the sidelink control channel based at least in part on receiving the sidelink control channel, wherein, to decode the sidelink control channel, the instructions are further executable by the processor to cause the apparatus to:
      measure a signal strength of the first set of symbols; and
    disable one or more radio frequency components associated with processing the sidelink transmission on a second set of symbols of the time slot based at least in part on the signal strength failing to satisfy a threshold.

14. The apparatus of claim 13, wherein the signal strength comprises a received signal strength indicator, and wherein the instructions are further executable by the processor to cause the apparatus to:
  compare the received signal strength indicator associated with the sidelink control channel to the threshold; and
  determine that the received signal strength indicator associated with the sidelink control channel fails to satisfy the threshold based at least in part on the comparing, wherein disabling the one or more radio frequency components is based at least in part on the received signal strength indicator associated with the sidelink control channel failing to satisfy the threshold.

15. The apparatus of claim 13, wherein the signal strength comprises a reference signal receive power, and wherein the instructions are further executable by the processor to cause the apparatus to:
  compare the reference signal receive power associated with the sidelink control channel to the threshold; and
  determine that the reference signal receive power associated with the sidelink control channel fails to satisfy the threshold based at least in part on the comparing, wherein disabling the one or more radio frequency components is based at least in part on the reference signal receive power associated with the sidelink control channel failing to satisfy the threshold.

16. The apparatus of claim 13, wherein the instructions to receive the sidelink control channel for the sidelink transmission are further executable by the processor to cause the apparatus to:
  receive, on a first subchannel associated with the first set of symbols, a first sidelink control channel candidate associated with the sidelink transmission; and
  receive, on a second subchannel associated with the first set of symbols, a second sidelink control channel candidate associated with the sidelink transmission.

17. The apparatus of claim 16, wherein disabling the one or more radio frequency components is based at least in part on decoding at least one of the first sidelink control channel candidate, the second sidelink control channel candidate, or both.

18. The apparatus of claim 13, wherein the instructions are further executable by the processor to cause the apparatus to:
receive, on a third set of symbols of the time slot, a demodulation reference signal associated with the sidelink transmission; and
determine a demodulation reference signal correlation based at least in part on the received demodulation reference signal, wherein disabling the one or more radio frequency components is based at least in part on the determined demodulation reference signal correlation.

19. The apparatus of claim 18, wherein the demodulation reference signal correlation is determined based at least in part on an antenna port, a demodulation reference signal orthogonal frequency-division multiplexing symbol, a sample index, the received demodulation reference signal, or a combination thereof.

20. The apparatus of claim 13, wherein the instructions to disable the one or more radio frequency components are further executable by the processor to cause the apparatus to:
disable a baseband processing on the second set of symbols of the time slot based at least in part on decoding the sidelink control channel.

21. The apparatus of claim 20, wherein the baseband processing comprises at least one of a channel estimation procedure, a time and frequency-domain synchronization procedure, a demodulation procedure, a decoding procedure, or a combination thereof.

22. The apparatus of claim 13, wherein the one or more radio frequency components comprise at least one of an antenna, a mixer, an amplifier, or a combination thereof.

23. The apparatus of claim 13, wherein the first set of symbols comprises two orthogonal frequency-division multiplexing symbols or three orthogonal frequency-division multiplexing symbols.

24. The apparatus of claim 13, wherein the sidelink control channel comprises at least one of a first sidelink control information, a second sidelink control information, or a combination thereof.

25. An apparatus, comprising:
means for receiving, on a first set of symbols of a time slot, a sidelink control channel for a sidelink transmission;
means for decoding the sidelink control channel based at least in part on receiving the sidelink control channel, wherein the means for decoding the sidelink control channel comprise:
means for measuring a signal strength of the first set of symbols; and
means for disabling one or more radio frequency components associated with processing the sidelink transmission on a second set of symbols of the time slot based at least in part on the signal strength failing to satisfy a threshold.

26. The apparatus of claim 25, wherein the signal strength comprises a received signal strength indicator, the apparatus further comprising:
means for comparing the received signal strength indicator associated with the sidelink control channel to the threshold; and
means for determining that the received signal strength indicator associated with the sidelink control channel fails to satisfy the threshold based at least in part on the comparing, wherein disabling the one or more radio frequency components is based at least in part on the received signal strength indicator associated with the sidelink control channel failing to satisfy the threshold.

27. The apparatus of claim 25, wherein the signal strength comprises a reference signal receive power, the apparatus further comprising:
means for comparing the reference signal receive power associated with the sidelink control channel to the threshold; and
means for determining that the reference signal receive power associated with the sidelink control channel fails to satisfy the threshold based at least in part on the comparing, wherein disabling the one or more radio frequency components is based at least in part on the reference signal receive power associated with the sidelink control channel failing to satisfy the threshold.

28. The apparatus of claim 25, further comprising:
means for receiving, on a third set of symbols of the time slot, a demodulation reference signal associated with the sidelink transmission; and
means for determining a demodulation reference signal correlation based at least in part on the received demodulation reference signal, wherein disabling the one or more radio frequency components is based at least in part on the determined demodulation reference signal correlation.

29. The apparatus of claim 25, wherein the means for disabling the one or more radio frequency components further comprise:
means for disabling a baseband processing on the second set of symbols of the time slot based at least in part on decoding the sidelink control channel.

30. A non-transitory computer-readable medium storing code, the code comprising instructions executable by a processor to:
receive, on a first set of symbols of a time slot, a sidelink control channel for a sidelink transmission;
decode the sidelink control channel based at least in part on receiving the sidelink control channel, wherein the instructions to decode the sidelink control channel are executable by the processor to:
measure a signal strength of the first set of symbols; and
disable one or more radio frequency components associated with processing the sidelink transmission on a second set of symbols of the time slot based at least in part on the signal strength failing to satisfy a threshold.

* * * * *